Figure 1:
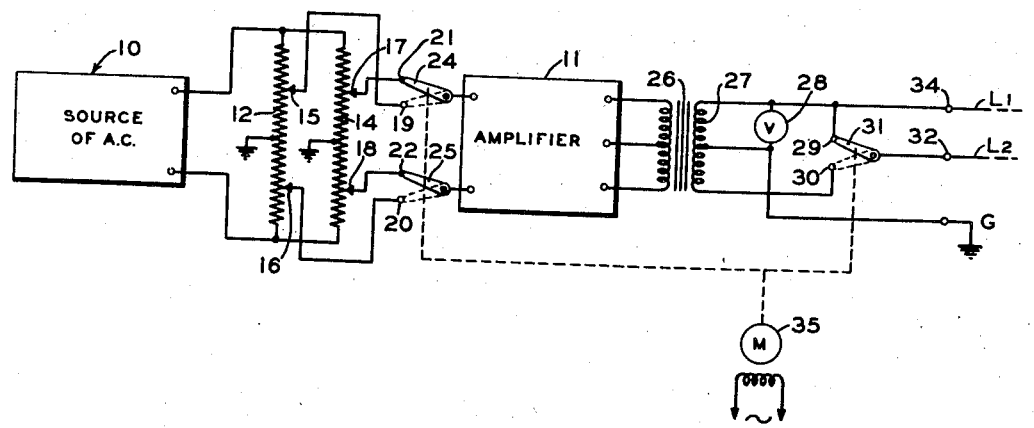

Aug. 12, 1947.         D. H. NELSON ET AL         2,425,554
MEANS FOR AND METHODS OF LOCATING FAULTS IN ELECTRICAL CONDUCTORS
Filed May 8, 1943

INVENTORS
D. H. NELSON
J. R. COSBY
BY
W. C. Middleton
ATTORNEY

Patented Aug. 12, 1947

2,425,554

UNITED STATES PATENT OFFICE 2,425,554

MEANS FOR AND METHOD OF LOCATING FAULTS IN ELECTRICAL CONDUCTORS

Dale H. Nelson, Southampton, N. Y., and James R. Cosby, Towson, Md., assignors to The Western Union Telegraph Company, New York, N. Y., a corporation of New York Application May 8, 1943, Serial No. 486,163

6 Claims. (Cl. 175—183)

This invention relates to means for and methods of locating faults in communication lines, and more particularly to means for and methods of locating either open faults or grounds on such lines.

Heretofore various methods have been employed in the location of faults, such as open faults or grounds on communication lines, such methods often involving switchboard computations, but such methods for the most part, while accurate within close ranges will not suffice to locate definitely an open fault, if the faulted line is insulated or covered, and the covering is not broken.

An object of the invention is to provide apparatus and methods operable in such fashion as to enable a lineman to locate definitely an open fault or ground on a communication line.

Another object of the invention is to provide means for establishing a desired field around a communication line together with means which can be carried along the line for investigating the character of the field.

Another object of the invention is to provide apparatus and methods whereby a field can be created around a faulted communication line and a neighboring unfaulted line, which field has different characters on the respective sides of the fault, together with means transportable along the line for locating the point at which the character of the field changes.

A further object of the invention is to provide means for creating an electrostatic field around a faulted line and a companion unfaulted line in such manner that the character of the field is changed at the point of fault, together with means transportable along the line for locating the point of change of character of the field.

An additional object of the invention is to provide means for creating a field as aforesaid in which the character of the field is determined by cyclic variation in the manner in which the alternating current creating the field is applied to the faulted line and its companion line.

A further object of the invention is to provide means for creating an electromagnetic field around a faulted line and a companion line, with the field being varied in the manner before mentioned, together with means transportable along the line for determining the exact point at which change in field character occurs.

In carrying out the foregoing and other objects of the invention, use may be made of a locally generated source of alternating current. This source of alternating current can be amplified, if necessary, and applied to a faulted line, i. e., a line having an open fault or ground thereon, as well as upon a companion unfaulted line in such fashion that either an electrostatic field or an electromagnetic field is set up around the faulted line and its companion line. As an adjunct to such equipment, which would normally be located at a switching office, use is made of a portable amplifier or detector which can be carried along the line at some suitable distance therefrom by a lineman, such amplifier or receiver being tuned to the frequency of the applied alternating current and having such operating characteristics that the presence of the field, whether electrostatic or electromagnetic, can be detected either through a suitable meter, headphones, or a loudspeaker. As before mentioned, the alternating current is so applied to the line under investigation and a companion line that the character of the field varies on the respective sides of the point of fault. Consequently, by repeated investigations of the field by the lineman in his traverse along the line, this point of change of field character can be definitely located, and thereby the point of fault can be accurately determined.

In one form of the invention, the alternating current is applied to the two lines through the agency of an output transformer of an amplifier, such output transformer having the midpoint of its secondary grounded. With the opposite ends of the transformer secondary connected to the faulted line and its companion line, respectively, it follows that, if the point of grounding of this secondary is at its exact center, the alternating current voltages applied to the two lines will be substantially 180° out of phase, with the result that the electrostatic fields around these two lines will substantially balance each other so that up to the point of fault no appreciable field can be detected by the portable equipment. Beyond the point of fault, however, only the field around the unfaulted line will be present, and such field can be detected and amplified by the portable equipment. The point at which this change of character of fields occurs (the point of fault) can be traced directly due to the change in character of these fields.

However, should the grounding of the secondary of the transformer take place at a point away from the electrical center, the transformer be otherwise unbalanced, or should extraneous fields be set up around other communication lines nearby, it is possible that the point of transition from one field character to another will not be sharp enough to permit ready ascertainment of the fault location. To prevent such occurrence, the invention also contemplates an arrangement wherein the lines, i. e., the faulted line and its companion line, are connected as before described to the opposite ends of the output transformer, alternately with a connection in which both lines are connected only to one end of the transformer. Thus, when the lines are connected to opposite ends of the transformer, as previously described, the fields will either completely balance each other with no appreciable net signals or the detectable signal will be of very faint character. However, in the alternate position under this modification, since both lines are connected to the same end of the transformer, the field will be of strong character, with a readily detectable signal. This alternate arrangement, if the connections are obtained by a cyclically operating switch, will cause either a strong signal in the receiving apparatus, followed by no signal, or a very faint signal, and such alternation will continue until the portable equipment has been transported past the point of break or fault. At this time the signal will be of repeated uniform volume, since the good line is connected at each switching operation to the same end of the transformer, and the faulted line is connected to that end only on alternate switching cycles.

Figure 2:
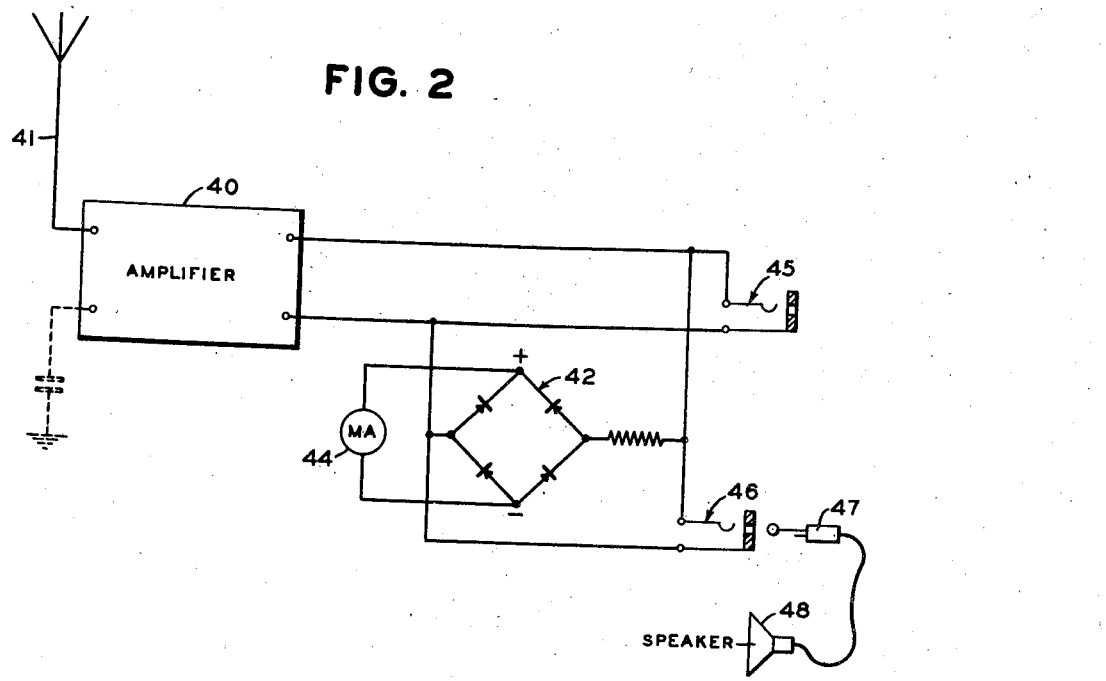

Other features, objects and advantages of the invention will become apparent by reference to the following detailed description of the accompanying drawings, wherein:

Fig. 1 represents a schematic circuit diagram of apparatus utilized for creating the desired field around a faulted line and its companion line; and Fig. 2 is a schematic circuit diagram of the portable equipment utilized for investigating a field so created.

Referring now to the drawings and particularly to Fig. 1, 10 indicates generally a source of alternating current such as an oscillator or any other type of mechanism which can be utilized for generating alternating current of the order of, say, 1000 cycles. This oscillator can be connected to an amplifier 11 of any well-known type by means of parallel resistor connections, such parallel resistors being indicated at 12 and 14. The midpoint of each of these resistors is grounded as shown, and adjustment members 15 and 16 are utilized for the two halves of the resistor 12, while similar adjusters 17 and 18 are utilized for the two halves of the resistor 14. The members 15 and 16 are connected respectively to switch terminals 19 and 20, while the members 17 and 18 are connected respectively to switch terminals 21 and 22. Switch members 24 and 25 have their terminals connected to the amplifier 11, which amplifier feeds an output transformer 26, the secondary 27 of which has its midpoint grounded as shown. A voltmeter 28 is connected across one-half of the secondary 27, while the opposite terminals of the secondary are connected respectively to switch terminals 29 and 30. A switch member 31 can be moved to engage either of the terminals 29 or 30, and the switch member 31 is connected to a terminal 32 to which a communication line to be tested can be connected. Similarly, the upper terminal of the secondary 27 is connected to a terminal 34 to which a second communication line can be attached.

The switch members 24, 25 and 31 are connected together in such fashion as to operate in unison, and, if desired, they can be driven by a suitable motor 35.

Referring now to Fig. 2, the field investigation equipment utilized in this invention comprises an amplifier 40 of any well-known type to which is connected an antenna 41. The antenna may be of the rod type such as collapsible rods commonly used for automobile radio antennas or may be a shielded loop type for a purpose to be explained later. The output of this amplifier, which in practice is tuned to the same frequency as the source 10, is connected in such fashion as to include a rectifier 42 across which is bridged a meter 44 of suitable character, such as a milliammeter. In addition, the output of the amplifier is bridged by a suitable jack 45 to receive the plug of a headphone set and a similar jack 46 to receive the plug 47 of a loudspeaker 48.

The operation and use of this mechanism in carrying out the methods of the present invention are substantially as follows. Assuming that a communication line is in such condition that an open fault therein is indicated, the terminal of this line in a switching office or other office in which the equipment of Fig. 1 is installed can be connected to the terminal 32. Likewise another communication line such as the companion line of a twisted pair or any other unfaulted line extending in the immediate vicinity of the faulted line is connected to the terminal 34. The switch members 24, 25 and 31 can be moved manually to their dotted line positions of Fig. 1. Oscillations from the source 10 are then supplied to the amplifier 11 where they are amplified and the thousand cycle voltage transmitted along the two lines designated L1 for the unfaulted line and L2 for the faulted line. The two adjustment members 15 and 16 are adjusted along the resistor 12 to cause an output voltage of the order of 50 volts as measured by the meter 28.

With this alternating current applied to the two lines, it follows that the two lines are carrying voltages 180° out of phase so that, if a lineman transporting the equipment of Fig. 2 along the line at a suitable distance roughly parallel to the two lines investigates the electrostatic field at intervals between the points of application of the alternating current and the fault, he will find very little evidence of signal, since the two fields around the two lines L1 and L2 will cancel each other almost completely. However, beyond the open fault on line L2 this condition will not prevail, since the only electrostatic field in existence in that zone is the field around the unfaulted line L1. It follows, therefore, that the lineman in the course of repeated investigations can determine on which side of the fault his investigation at a particular moment is being made, and due to the fact that a sharp transition exists between a zone in which the fields are substantially canceled and a zone in which a single uncanceled field exists around line L1, the actual point of break can be readily determined. The desired results can be obtained if the investigation is carried out as closely as possible to the lines, since the difference between the field conditions is more critical near the lines.

This type of fault location is particularly advantageous in connection with ascertaining the condition of an insulated or covered wire, since the actual wire might be broken with the break invisible due to the insulation or covering. The investigation can be accomplished by transporting the equipment of Fig. 2 in an automobile and, if desired, the usual automobile antenna can be connected to the equipment for carrying out the investigations. Under some conditions, if the automobile is close enough to the line, the investigation can be carried out while the car is in motion, but in other instances it may be necessary to stop the car for each investigation. The presence or absence of the field can be noted either by use of the meter 44, by use of headphones plugged into the jack 45, or by the loudspeaker plugged into the jack 46. If the signals are of a weak character, it may be desirable to rely principally on the headphones. The method just outlined is well adapted for finding an open fault in a twist pair where one line of the pair is open. If both lines of the same pair are open, the two lines may be treated as one wire, in which instance each may be connected to the terminal 32 and a third wire on the same pole line can be connected to the terminal 34 and used to make up a pair for comparison purposes.

As stated before, the method just described will be found to suffice in most instances, but some conditions may require the use of the preferred form of the invention. For example, the degree of cancellation of the two out-of-phase voltages applied to the lines L1 and L2 may not be complete enough to avoid confusion, particularly if some unbalance exists in the transformer, or if the difference in attenuation of the two lines is appreciable. Under such circumstances it might be difficult for the lineman to judge whether this small signal is due to the state of imperfect balance or be a legitimate indication that he had progressed beyond the open fault. In order that these disadvantages may be overcome the following method of operation may be employed.

Instead of maintaining the line L2 connected continuously to the end of the transformer secondary 27 opposite to that end to which the line L1 is connected, the line L2 can be connected alternately to the same end of the transformer as the line L1. This connection can be carried out by movement of the switch member 31 from the dotted line position of Fig. 1 to the full line position thereof. Concurrently the two switch members 24 and 25 are also moved to their full line positions, and in this position the adjusting members 17 and 18 can be moved along the resistor 14 to such position as to cause the output voltage as measured by meter 28 to again be of a value of approximately 50 volts. Since the impedance of the combined lines L1 and L2 generally differs from that of either line separately, it follows that the adjustment of the resistor 14 is necessary to cause the same voltage to be applied in either position of the switch 31. With the proper adjustment having been made, the switch member 31 together with switch members 24 and 25 can be moved in cyclic order from their full line to their dotted line positions, and such movement can either be accomplished manually or through the agency of a motor 35 so connected to move the switch elements simultaneously as to obtain the desired cyclic operation thereof.

When the switches are moved to their full line positions, it follows that the alternating current is applied to both lines L1 and L2 simultaneously so that at any point along these lines on either side of the fault in line L2 an electrostatic field is produced, which field can be detected by the portable equipment. However, when the switches are in their dotted line positions, the same condition prevails as previously described so that during this part of the cyclic movements of the switches no appreciable field or only a slight field is produced around the lines between the point of application of the alternating current and the open fault in line L2. Thus, if the lineman investigates the field at a point between the terminals 34 and 32 and the open fault on line L2, only every other signal will be detectable either through the meter, headphones, or loudspeaker, or if a small amount of unbalance exists a very small echo effect will be observed. The difference between the amplitudes of the two signals will be noted easily either by ear or by observing the output meter. If, however, the lineman investigates the field beyond the open fault, every signal will be detectable either audibly or visually, since the line L1 has alternating current applied thereto in each half cycle of switch movement. Consequently, as long as the lineman detects only every other signal or detects one strong signal and one weak signal or echo, he knows that he is on the good side of the open, i. e., between the transmitter and the open fault. As he progresses along the line, this condition will continue until he is at the open fault, at which point the signal will abruptly change to a double character of substantially uniform amplitude and continue double from that point on. The sharp transition in the character of the signal means that a lineman can leave the line for a number of miles, return to it and instantly tell on which side of the open fault his investigation is being made. This method is particularly adaptable in the investigation of a line from a highway approximately parallel to and at some distance from the pole line. The method just described, which is the preferred method, can be used on lines of a character previously described with equal facility and with advantages over the method first described. As before stated, where only one pair of wires is involved, such as a tieline pair, the first method may suffice, but where other lines are on the same pole support it might be possible for neighboring wires to pick up the thousand cycle note and carry the same beyond the point of the break. Therefore, the preferred method is of particular utility.

In addition to locating open faults in lines, the apparatus described herein and the methods previously noted in connection therewith can also be used for the testing of grounds on the line with certain modifications. For example, instead of using an ordinary antenna such as a collapsible rod antenna, use may be made of a shielded loop antenna so that the electromagnetic field around the wire can be investigated instead of the electrostatic field. Under these conditions, it is necessary to ground the good line L1 at its distant terminal, and when so grounded the electromagnetic field established by the applied alternating current can be investigated and the existence of the same can be noted in the same manner as set forth in connection with the investigation of electrostatic fields. In the dotted line position of the switch members at the transmitter, the electromagnetic field will be practically zero between the transmitter and the point of grounding on the faulty line L2 but will be of appreciable character beyond the ground fault point. In the other full line position of the switch members, the electromagnetic field will be substantially uniform throughout the length of the lines. Consequently, it follows that either of the methods previously described for locating an open fault can be employed in the location of a ground on either line. As an alternative method of detection or investigation of the electromagnetic field established by the applied alternating current, the antenna, other than a shielded loop, can be pushed into the ground at each point of investigation so that the potential drop in the ground of the fault current flowing back to the transmitter can be picked up.

In addition to its utility in connection with locating faults along lines as before described, the present invention is also useful in connection with the manufacture of communication lines, either in the nature of covered strands usually in twisted pairs, or in the nature of multi-conductor cables. For example, in the manufacture of covered twisted pair wires the transmitter herein described can be connected to the ends of the two wires as they are wound on reels or the like by slip ring connections, or by any other conventional connectors. An antenna, such as a metal plate or the like, is located adjacent the path of travel of the twisted pair and between the reel and the mechanism used in the manufacturing process. This antenna is connected to the receiving apparatus in the manner shown in Fig. 2, it being understood, however, that the receiver remains stationary while the twisted pair passes the antenna; a reverse procedure from that outlined previously, in which the receiver is transported along the line.

When the apparatus is used as just described, either of the two methods of operation can be employed with the first method operating in such fashion that as long as both wires are unfaulted no signal or no signal of appreciable character can be observed. Should either wire of the pair be faulted, however, a noticeable signal will become existent immediately and the location of the fault can then be accurately determined. This first method of operation, however, is not as advantageous for locating faults in wire during manufacture as the second method, for the reason that a breakage in both wires would not be noticeable immediately due to the fact that such breakage would prevent the creation of any field beyond the point of break.

Accordingly, for the best purposes it is desirable that the second method of operation before described be used for testing wires during manufacture or immediately thereafter since this method, i. e., the creation of alternate strong and weak signals, or strong signals alternately with no signals, will serve to determine the location of a fault in either wire or in both wires, it being evident that should both wires be faulted, no field would be created beyond the points of fault.

This invention is also of utility in connection with the testing of multi-conductor cables immediately upon the completion of their manufacture. For this purpose transmitters tuned to different frequencies can be supplied for the respective pairs of conductors in the cable. For example, the various transmitters can be tuned at 1000 cycles, 2000 cycles, 3000 cycles, and so on indefinitely as the number of pairs in the cable may require. These spacings of frequencies are given merely for the purpose of illustration and not for any limitations upon the invention. In addition, the single plate-like antenna may have leads therefrom extending to receivers or testing equipment also tuned to the plurality of various cycles of the respective transmitters. Thus with the different transmitters connected through slip rings or other conventional connections to the pairs of conductors in the cable and with the receivers connected to the antenna, it is possible to simultaneously examine any fields which may be created around any pairs of conductors in the cable and thereby location of any faults can be accurately determined.

From the foregoing it will be seen that the methods employed in connection with the herein disclosed apparatus makes possible accurate location of faults, either of open character or of grounded character, and that these methods and this apparatus can be employed solely for the purpose of locating such faults or can be employed complementary to other methods for approximately locating faults by switchboard computations such as the method set forth in our copending application Serial No. 486,162, filed May 8, 1943 for Apparatus and methods for fault location. It will be understood that the invention herein disclosed is capable of modification and therefore that any limitations imposed upon the same are to be only those set forth in the following claims.

What is claimed is:

1. The method of locating a fault in a communication line which comprises successively and alternately applying alternating voltages of opposite phase with respect to ground to the faulted line and to a companion unfaulted line, and alternating voltages of the same phase with respect to ground to both lines, and measuring along the lines the field around the lines to determine the point at which the character of such field changes.

2. The method of locating a fault in a communication line which comprises so alternately connecting the faulted line and a companion unfaulted line to a source of alternating current as to alternately apply alternating voltages in opposed phase relation with respect to ground and the same phase relation with respect to ground between the two lines, and measuring along the lines the field created by the applied alternating voltages to determine the point at which the character of such field changes.

3. Apparatus of the character described comprising a source of alternating current, means for alternately connecting a pair of communication lines to said source so as to obtain an opposed phase relation between the two lines and for connecting said lines together and to said source in the same phase relation, and means responsive to the applied alternating current for investigating the field set up around the lines by said applied alternating current.

4. Apparatus of the character described comprising a source of alternating current, an output transformer having the midpoint of its secondary grounded, and switching means operable in one position to connect a pair of communication lines to opposite ends of said secondary and in the other position to connect said lines together and to one end of said secondary, means for operating said switching means from one of said positions to the other alternately, and means responsive to the applied alternating current for investigating the field set up around the lines by said applied alternating current.

5. Apparatus of the character described comprising a source of alternating current, an output transformer having the midpoint of its secondary grounded, and switching means operable in one position to connect a pair of communication lines to opposite ends of said secondary and in the other position to connect said lines together and to one end of said secondary, means for causing the alternating current applied to said lines to be of the same potential for each position of said switching means, means for operating said switching means from one of said positions to the other alternately, and means responsive to the applied alternating current for investigating the field set up around the lines by said applied alternating current.

6. Apparatus of the character described comprising a source of alternating current, an amplifier therefor, an output transformer having the midpoint of its secondary grounded, switching means operable in one position to connect a pair of communication lines to opposite ends of said secondary and in the other position to connect said lines together and to one terminal of said secondary, means between said source of alternating current and said amplifier for varying the output of said transformer, second switching means synchronized with said first switching means for varying the output of said transformer as the connection of said lines thereto is varied, and means responsive to the applied alternating current for investigating the field set up around the lines by said applied alternating current.

DALE H. NELSON.
JAMES R. COSBY.

REFERENCES CITED

The following references are of record in the file of this patent:

UNITED STATES PATENTS

| Number | Name | Date |
|---|---|---|
| 1,462,053 | Stoller | July 17, 1923 |
| 1,588,572 | Chatham | June 15, 1926 |
| 2,249,166 | Parker et al. | July 15, 1941 |
| 2,291,533 | Cummings | July 28, 1942 |
| 1,464,119 | Stoller et al. | Aug. 7, 1923 |
| 1,475,749 | Chubb | Nov. 27, 1923 |
| 1,745,419 | Henneberger | Feb. 4, 1930 |
| 2,300,731 | Borden | Dec. 18, 1930 |
| 2,109,189 | Bly | Feb. 22, 1938 |

FOREIGN PATENTS

| Number | Country | Date |
|---|---|---|
| 339,731 | Great Britain | Dec. 18, 1930 |